United States Patent
Musante et al.

(10) Patent No.: US 7,152,104 B2
(45) Date of Patent: Dec. 19, 2006

(54) METHOD AND APPARATUS FOR NOTIFYING ADMINISTRATORS OF SELECTED EVENTS IN A DISTRIBUTED COMPUTER SYSTEM

(75) Inventors: Mark J. Musante, Westford, MA (US); Chhandomay Mandal, Nashua, NH (US); Peter J. Wagener, Somerville, MA (US); Melora L. Goosey, Andover, MA (US); Roberta A. Pokigo, Billerica, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 778 days.

(21) Appl. No.: 09/981,695

(22) Filed: Oct. 17, 2001

(65) Prior Publication Data

US 2003/0074446 A1    Apr. 17, 2003

(51) Int. Cl.
G06F 15/173 (2006.01)
G06F 9/44 (2006.01)
G06F 11/00 (2006.01)

(52) U.S. Cl. .................. 709/224; 717/120; 717/162; 714/38

(58) Field of Classification Search .......... 709/224; 713/38; 714/38, 20, 39, 47; 719/318, 331, 719/332; 717/108, 120, 162, 170

See application file for complete search history.

(56) References Cited

U.S. PATENT DOCUMENTS 5,920,692 A * 7/1999 Nguyen et al. ............. 709/204
6,405,318 B1 * 6/2002 Rowland ..................... 726/22
6,505,245 B1 * 1/2003 North et al. ................ 709/223
6,704,803 B1 * 3/2004 Wilson et al. ............. 719/315
6,748,555 B1 * 6/2004 Teegan et al. ............... 714/38
6,763,384 B1 * 7/2004 Gupta et al. ............... 709/224
6,769,022 B1 * 7/2004 DeKoning et al. ......... 709/223
6,772,178 B1 * 8/2004 Mandal et al. ............. 707/204
2002/0091753 A1 * 7/2002 Reddy et al. .............. 709/202

OTHER PUBLICATIONS

Miller, John; Seila, Andrew; Tao, Junxiu; "Finding a Substrate for Federated Components on the Web" Proceedings of the 2000 Winter Simulation Conference; pp. 1849-1854.*

* cited by examiner

*Primary Examiner*—Ario Etienne
*Assistant Examiner*—Uzma Alam
(74) *Attorney, Agent, or Firm*—Dorsey & Whitney LLP

(57) ABSTRACT

Dedicated federated beans monitor an event service in a data services management system and sends human-readable messages to people involved in the administration of management services in order to inform the administrators that an event they are interested in has occurred. In one embodiment, the beans each contain a category list indicating which events are of interest to the administrators and the beans cooperate with each other to insure that the category lists in the beans are synchronized. In another embodiment, the federated bean composes and forwards e-mail messages to administrators. In still another embodiment, the federated bean also monitors and reports messages posted to a logging service.

20 Claims, 4 Drawing Sheets

METHOD AND APPARATUS FOR NOTIFYING ADMINISTRATORS OF SELECTED EVENTS IN A DISTRIBUTED COMPUTER SYSTEM

FIELD OF THE INVENTION

This invention relates to management of data services and to methods and apparatus for notifying administrators who are managing the data services of selected events that have occurred in the data services.

BACKGROUND OF THE INVENTION

In a large, distributed computer system connected by a network, management personnel and resources typically manage the system from a system console using a command line interface (CLI) or a graphic user interface (GUI). These interfaces directly, or indirectly, control various data management services, such as data replication, imaging, caching and remote notification services. One embodiment of such a system has three tiers. The upper tier comprises the GUI and CLI presentation programs. The middle tier comprises one or more federated Java beans that communicate with each other and the presentation programs. The lowest tier comprises management facades that control kernel routines that actually implement the data services.

The federated beans can use a distributed management framework that implements the FMA specification for distributed management of data services. This framework is called the Jiro™ framework (trademark of Sun Microsystems, Inc.) and is developed by Sun Microsystems, Inc. Those skilled in the art would realize that other similar distributed frameworks could also be used. The Jiro™ framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

Jiro™ technology provides an event service that is used by software components to receive notifications of selected events generated by other components. Each management domain has a single (possibly replicated) logical event service for the domain. This event service is registered at a well-known location with the lookup service for a particular management domain and implements a predetermined interface.

The Jiro™ technology event service is a collection of "topics" to which event sources can post events and from which event service "subscribers" can receive events. A topic is a string field in an Event class that contains the name of the topic. The topics of the event service are organized into a hierarchy where each topic has a single parent topic and all topics ultimately descend from the root topic of the event service. Each topic is uniquely identified by appending the name of the topic to the name of its parent topic using a "." (dot) as a delimiter to form a topic path. The root topic is special and is denoted by ".". The topic path for a child of the root topic is the topic name with a single prepended ".". For example, the topic path of the top-level topic of error is .error.

Each topic of the event service accepts events from event sources and forwards those events to event subscribers who have indicated an interest in the topic by subscribing as listeners to the topic. An event subscriber is a software component that is registered to have an interest in the event that is forwarded to it. Each topic implies a specific class of event that it will accept and deliver, but there is no runtime maintenance or checking of this mapping. The topic simply copies events between the source and listener.

A Jiro™ "event" is an object that contains information about some external state change in which a software component may be interested. For example, an event can be generated when a disk completes a task of reading or writing or when a program completes execution.

The Jiro™ framework also provides for logging transactions in a variety of categories including audit, debug, warning, info, error and trace categories. The log service can store log objects that store certain decisions made, operations that have been requested or other information. Each stored log object contains a message, a category and possibly error information. Methods are provided by the log service to search for selected log objects, to find log objects and to maintain the log object storage area. Details of the Jiro™ framework and its event and logging services are available in the "Jiro™ Technology SDK Programmer's Reference Manual" available at http://www.jiro.com, which manual is incorporated by reference in its entirety.

Because the data services are distributed, administrative personnel may be located in a completely different area from where the services are actually implemented. In order to avoid having to continually monitor remote services in addition to local services, it would be convenient for administrative personnel if they could automatically be notified when selected events occur both in local and remote services for which they are responsible. The Jiro™ event service provides notification to program objects. Consequently, it would still be necessary for administrative personnel to periodically monitor programs that display the Jiro™ notifications.

SUMMARY OF THE INVENTION

In accordance with one embodiment of the invention, a dedicated Jiro™-based federated bean monitors the Jiro™ event service and sends human-readable messages to people involved in the administration of management services in order to inform the administrators that an event they are interested in has occurred.

In one embodiment, the federated bean composes and forwards e-mail messages to administrators.

In another embodiment, the federated bean also monitors and reports messages posted to the Jiro™ logging service.

In still another embodiment, federated beans are provided in each host computer system of a distributed computer system. The beans each contain a category list indicating which events are of interest to the administrators and the beans cooperate with each other to insure that the category lists in the beans are synchronized.

BRIEF DESCRIPTION OF THE DRAWINGS

The above and further advantages of the invention may be better understood by referring to the following description in conjunction with the accompanying drawings in which.

DETAILED DESCRIPTION

A remote notification system constructed in accordance with the principles of the invention operates in a data services management system that comprises three layers or tiers. The first, or upper, tier is a presentation layer with which a manager interacts at a single host location. The upper tier, in turn, interacts with the middle tier comprised of a plurality of federated beans, each of which performs specific tasks in the system. The federated beans can communicate with each other both in the same host and in other hosts via a network connecting the hosts. Some of the beans can communicate with the lowest tier that comprises the aforementioned kernel modules that actually perform the data services. Although the remote notification system, as described below, informs administrators regarding data services system events, the remote notification system can also be used to inform administrators of events occurring in any Jiro™-based service.

Figure 1:
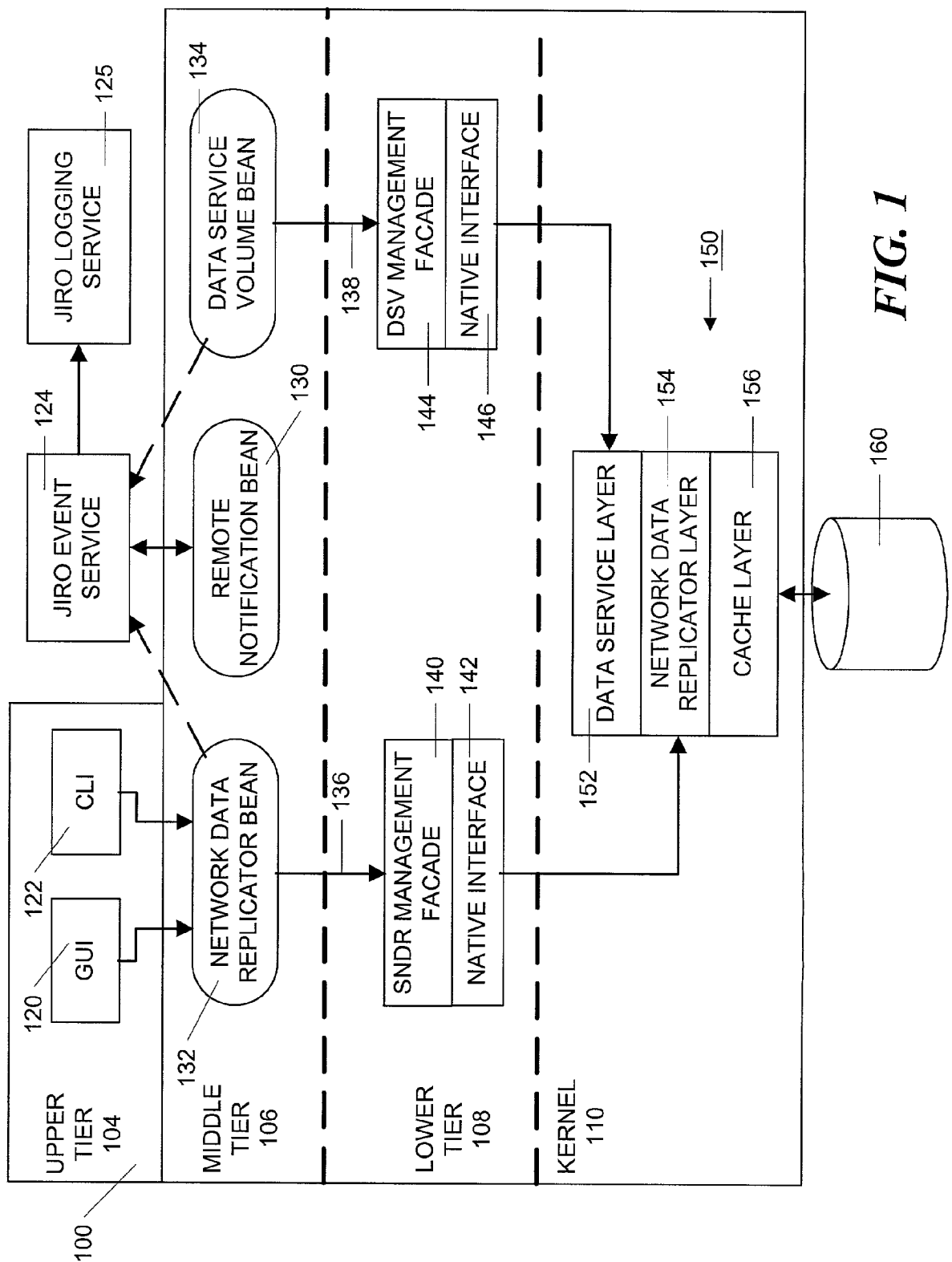
FIG. 1 is a block schematic diagram of a host computer system showing the three-tiered data service management system incorporating the remote notification arrangement of the present invention.

FIG. 1 shows a host system 100 that illustrates the contents of the three tiers running in the memory of a single host. The inventive data service system comprises three layers or tiers: an upper tier 104, a middle tier 106 and a lower tier 108. The upper tier 104 is a presentation level that can be implemented with either a graphical user interface (GUI) 120 or a command line interface (CLI) 122. A manager interacts with this level, via the GUI 120 or CLI 122, in order to create, configure and manage a data services system. The GUI 120 and the CLI 122, communicate with a federated bean that actually controls a particular data service. For example, in FIG. 1, the GUI 120 and the CLI 122 communicate with a bean 132 running in the host 100 where the GUI 120 and CLI 122 are running as indicated in FIG. 1. Bean 132 implements a network data replication data service.

The middle tier 106 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http://java.sun.com/aboutJava/communityprocess/final.html. The federated beans use the aforementioned Jiro™ framework to implement the FMA specification for distributed management of data services.

The remote notification system constructed in accordance with the principles of the present invention is implemented by a federated bean called a remote notification (RN) bean 130. The data services themselves are implemented by other federated beans running in host 100. These other beans include an SNDR bean 132 and a data services volume (DSV) bean 130. SNDR bean 132 implements a network data replication service and DSV bean 130 locates, configures and manages volumes used by the SNDR bean. Other beans may implement other data services, including a data imaging service a configuration service, a data services lookup system and a caching service. These other beans and services are not shown in FIG. 1 in order to simplify the figure. The data replication bean 132 communicates with the DSV bean 130 whenever data replication bean 132 starts or stops using a volume managed by DSV bean 130.

In order to manage a network data replication system, data replication bean 132 communicates with a data replication layer 154 in the layered stack 150, via a data replication management facade 144 and a native interface 146. The data replication capability is actually implemented in the kernel layer 110 shown running in host 100 in FIG. 1. In particular, access by the host 100 to a resource 160, which can be a data storage component, is provided by a layered stack 150 comprising a data service volume layer 152, a network data replication layer 154 and a cache layer 156 and may also include other layers (not shown in FIG. 1). Application programs running in host 100, and the host file system, access resource 160 though the layered stack 150 and layers 152–156 cooperate to implement the various data services. For example, the data service volume layer 152 places itself between device drivers in the normal data path and shunts I/O information through the other data service layers 154 and 156.

The data services layers would generally by implemented in platform-specific code, for example, in C routines, that expose application programmer interfaces (APIs) that can be accessed only from the host in which the layer is installed. In order to provide for remote management capability in accordance with the principles of the invention, the data replication layer 154 and the data service volume layer 152 are controlled by software running on the lower tier 108 of the data services system. The lower tier includes native interfaces 142 and 146 that convert the APIs exported by the layers 154 and 152 into a platform-independent language, such as Java™.

The native interfaces 142, 146 are, in turn, controlled by management facades 140 and 144 that provide the required remote management capability. In particular, the management facades 140, 144 provide a means by which the respective layers 154 and 152 can be accessed and managed as Jiro™ services. The management facades are essentially object-oriented models of the kernel-resident layers 154 and 152 and provide a collection of APIs to manage their associated layers.

In accordance with the principles of the invention, an RN bean 130 is provided in the middle tier 106 of each host in the system. The RN bean 130 is responsible for monitoring both the Jiro™ event service 124 and the Jiro™ logging service 125. A CLI that can be used to configure the RN bean has been omitted from FIG. 2 in order to simplify the figure. As indicated by the dotted lines, the other data services represented by the network data replicator bean 132 and the data service volume bean 134 also generate events to the Jiro™ event service 124 and receive notifications from the Jiro™ event serviced 124.

In one embodiment of the management services system, each host resides in its own Jiro™ federation. For example, a host A would be in the jiro:A federation, and a host B would be in the jiro:B federation. Thus, there will also be an RN bean in each federation to listen to the events and to the logged messages generated by the host in that federation.

In order to simplify the process of configuring the RN beans, an administrator, using a CLI, will only have to contact one of the RN beans. When the configuration an RN bean changes, that bean will forward that configuration change to all the other RN beans. The best way to get this configuration information broadcast is by putting all RN beans in the same federation called the jiro:RN federation and use the Jiro™ event service to broadcast the information. In this manner, the beans can all listen to the same set of events and can adjust their configuration accordingly. This means that each RN bean will be in two Jiro™ federations at the same time: its host federation and the jiro:RN federation.

Figure 2:
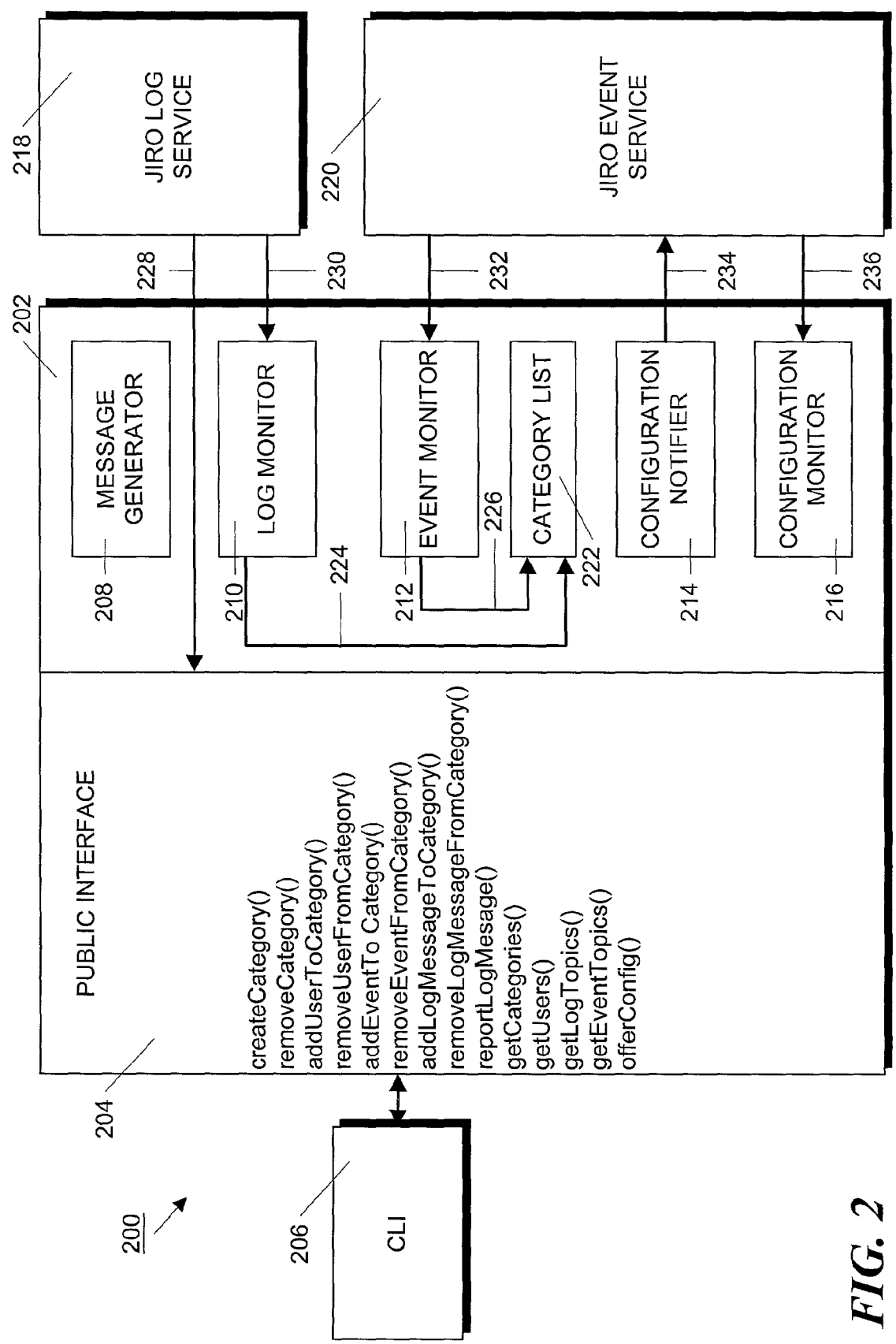
FIG. 2 is a block schematic diagram illustrating the interfaces exported by an exemplary remote notification bean, the internal bean components and their relationship with Jiro™ services.

FIG. 2 illustrates the components in an exemplary RN bean 200. These components include a public interface 201 that includes methods by which the CLI 206 interacts with the bean 200. A GUI (not shown in FIG. 2) may also be used to control the RN bean 200 in a conventional fashion. The bean implementation 202 includes an message generator 208 that creates human-readable messages based on the events and log messages that are received or found. For example, these human-readable messages can be conventional e-mail messages. The messages are then posted to a conventional delivery service for delivery to the appropriate users. A log monitor 210 scans log files in the Jiro™ log service 218 periodically to find significant events as indicated schematically by arrow 230. An event monitor 212 receives notifications from the Jiro™ event service 220 when significant events occur as indicated schematically by arrow 232. The configuration notifier 214 generates configuration change messages and forwards them, via the Jiro™ event service 220, to all other RN beans based on commands received from the CLI 206. The configuration monitor 216 receives configuration change messages from the Jiro™ event service 220 and implements the changes. A method in the public interface 204 can also be called directly by the Jiro™ log service 218, as discussed below.

In one embodiment, all events that are of interest to administrators are assigned to one or more "categories" that are stored in a category list 222. The categories provide a way of grouping the events together. A default set of categories will be provided when an RN bean is first installed and is stored in the category list 222. The user of bean 200 can add new categories and existing categories can be removed using the interface methods described below.

Figure 3:
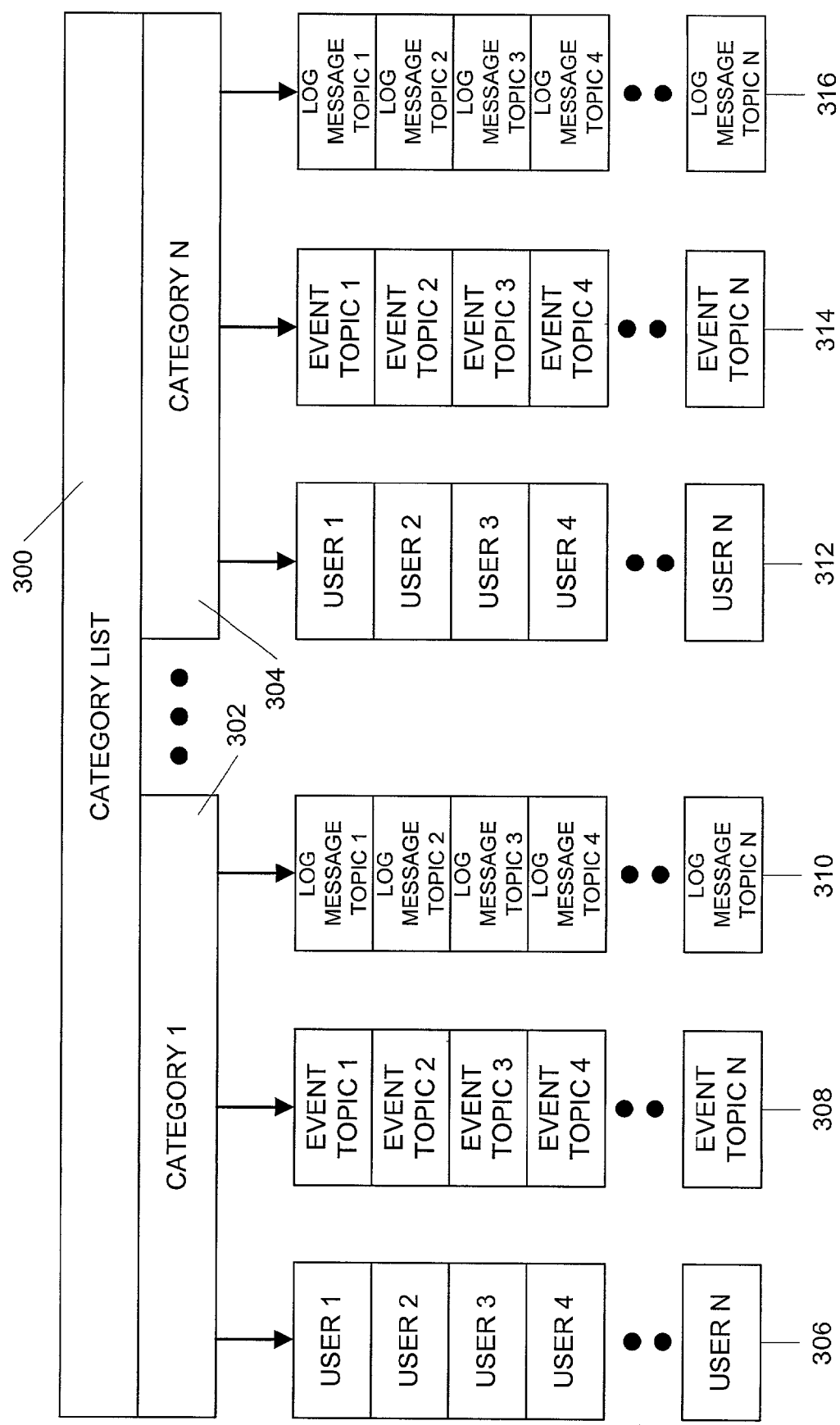
FIG. 3 is a block schematic diagram illustrating the category list data structure.

The category list is shown in more detail in FIG. 3. List 300 comprises a set of categories, of which categories 302 and 304 are shown. Each category, such as category 302, has a list of users 306 that includes their e-mail addresses. Each category 302 also has a list of event topics 308. When an event is detected by event monitor 212 as indicated schematically by arrow 226, and its topic matches one of the event topics in list 308, all the users in user list 306 are informed of the event by e-mail messages generated by generator 208 and sent to their e-mail address. A sample e-mail message is as follows:

To: Sysadmin
From: Data Services Notification Service
Subject: Event from IIBean
The following event has occurred:
Event Host: hostA
Event Class: com.sun.esm.services.ii.fb.beans.I-IBeanSetOfflinedEvent
Event Description: An error has occurred in the II set "/dev/rdsk/c0t3d2s4" which has caused Instant Image to disable that set.

A user can add event topics to, and remove event topics from list 308 using the interface methods described below. In addition, category 302 has a log message topic list 310. When a log message is found during a scan by the log monitor 210, as set forth below, and its topic matches one of the log message topics in list 310 as indicated schematically by arrow 224, all the users in user list 306 are informed of the message by an e-mail generated by generator 208 and sent to their e-mail address. A sample e-mail message is as follows:

To: Sysadmin
From: Data Services Notification Service
Subject: IIBean Log
The following item has been logged:
Logging host: hostB
Logging class: com.sun.esm.services.ii.fb.beans.I-IBeanSetNotFoundException
Logging description: An attempt to locate the set "/dev/rdsk/c0t5d10s2" failed.

A user can add log message topics to, and remove log message topics from list 310 using the interface methods described below. Similarly, each other category, such as category 304 has a user list 312, an event topic list 314 and a log message topic list 316.

The public interface 201 has a number of publicly available methods for use in configuring and controlling the RN bean 200. These methods include the createCategory( ) method that creates a new category. The category must not already exist. If it does, an exception will be thrown. Parameters include the category name of the category to create.

The removeCategory( ) method removes an existing category. If the category doesn't exist, an exception will be thrown. If the category isn't empty (in other words, there are users and events still part of the category) then an exception will be thrown. Parameters include the category name of the category to delete.

The addUserToCategory( ) method adds a user to a category. This means that, whenever an event or log messages associated with the category is detected, this user, along with all other users in the category, will get an e-mail message. Parameters include the category name of category to which the user should be added, the username name of user and the email address of the user.

The removeUserFromCategory( ) method removes a user from a category. This means that the user will not be notified if any event or log message associated with the category is detected. Parameters include the category name of category from which user should be removed and the username name of user that should be removed.

The addEventToCategory( ) method adds an event to a category. The event is specified by a topic string. Any time an event object is received from the Jiro™ event service, which object contains the topic string, all the users that are part of the category are notified. Parameters include the category name of category to which the event topic should be added and the name of the event that should be added to the category.

The removeEventFromCategory( ) method removes an event from a category and, thereafter, this event topic will no longer generate an email message for this category. Parameters include the category name of category which will have an event topic removed and the name of the event that is being removed from the category.

The addLogMessageToCategory( ) method adds a log message to a category. The log message is specified by a topic string. Any time a log message is detected which begins with the topic string, all the users that are part of the category are notified. Parameters include the name of the category to which the log message topic should be added and the topic string of the log message that should be added to the category.

The removeLogMessageFromCategory( ) method removes a log message from a category. After the method is run, the specified log message will no longer generate an email message for this category. Parameters include the name of the category that will have a log message topic removed and the topic string of the log message that is being removed from the category.

The offerConfig( ) method is called on a first RN bean by a second RN bean to cause the first RN bean to provide the second RN bean with the current set of categories, event topics and log topics that are stored in the first RN bean. This method provides an RN bean that is starting operation with a method to replicate the data in other RN beans and to react properly to events and log messages.

One of the actions that can be performed by the RN bean is to scan the event log file in the Jiro™ log service 218 periodically (for example, once every minute) to determine if any event of significance has been recorded. One method to perform this scan is to simply scan the entire log file. However, scanning the entire log file periodically could be a serious drain of host processing time and might seriously affect network bandwidth. Therefore, in accordance with one embodiment, the log class in the Jiro service can be modified to not only write messages to the log file but also to forward the messages to the RN bean running in the same host as well. This operation allows the RN bean to be event-driven rather than data acquisition dependent.

The reportLogMessage( ) method is called by the Jiro™ log service when a new log message has been written to the log file. Parameters include the log message that will be considered. When a new message has been added, the event service for the Jiro™ federation will broadcast the event to all other RN beans. These beans then add the log message topics to their internal category lists described above.

The getCategories( ) method returns a list of all categories. The getUsers( ) method returns a list of all users in a given category. An exception is thrown if the category doesn't exist. Parameters include the category name of the category for which the user list is returned. The getLogTopics( ) method returns a list of all log message topics for a given category. Parameters include the category name of the category for which the list of topics is returned. The getEventTopics( ) method returns a list of all event topics for a given category. Parameters include the category name of the category for which the list of topics is returned.

The following is an illustrative set of events that can be generated for the jiro:RN federation by the Jiro event service when the methods described above regarding the RN bean public interface are run. When each method is run the configuration notifier 214 generates the appropriate event and posts it to the Jiro™ event service 220 as schematically indicated by arrow 234. In each RN bean, these events are monitored by the configuration monitor, such as monitor 216 as schematically illustrated by arrow 236. The events are used by each bean to perform actions that update the category lists in each bean to insure that the beans are synchronized. Included in the list is a description of the action taken by an RN bean when such an event is received.

Topic: "com.sun.esm.services.rn.fb.CreateCategory"
Data: String category
Action: Adds a new category to the known category list.
Topic: "com.sun.esm.services.rn.fb.RemoteCategory"
Data: String category
Action: A category has been removed from the known category list.
Topic: ".com.sun.esm.services.rn.fb.AddUser"
Data: RNUserData userData
Action: Adds a user category
Topic: ".com.sun.esm.services.rn.fb.RemoveUser"
Data: SRNUserData userData
Action: Removes a user from a category
Topic: ".com.sun.esm.services.rn.fb.AddEventTopic"
Data: RNEventData eventData
Action: Adds an event type to a category
Topic: ".com.sun.esm.services.rn.fb.RemoveEventTopic"
Data: RNEventData eventData
Action: Removes an event type from a category
Topic: ".com.sun.esm.services.rn.fb.AddLogTopic"
Data: RNEventData eventData
Action: Adds an event type to a category
Topic: ".com.sun.esm.services.rn.fb.RemoveLogTopic"
Data: RNEventData eventData
Action: Removes an event type from a category
Topic: ".com.sun.esm.services.rn.fb.RequestConfig"
Data: RNBean proxy
Action: Requests configuration data The remote notification federated bean can be controlled by a command line interface. The basic command is rnadm. Various parameters and variables are used with this command to generate the appropriate information that can be used by the RN Bean to perform the desired operation. The various operations that can be specified with the command line interface include the following rnadm-c-l List all categories rnadm-c-u catname List all users of the category "catname".

rnadm-c-e catname List all events assigned to category "catname".

rnadm-c-a catname Add "catname" as a new category.

rnadm-c-r catname Remove the category "catname".

rnadm-u-a catname username email Add user "username" to category "catname".

rnadm-u-r catname username Remove user "username" from category "catname"

rnadm-e-a catname event Add "event" to the category "catname".

rnadm-e-r catname event Remove "event" from the category "catname".

When using these commands, the command and accompanying parameters are first separated by a conventional parser. The CLI is written as a script that invokes a Java application with the parameters. The Java application, in turn, looks up a proxy to the RN bean and uses that to configure the remote notification bean to set up the categories, users and events. A new proxy is created, used and destroyed each time a command is entered.

Figure 4:
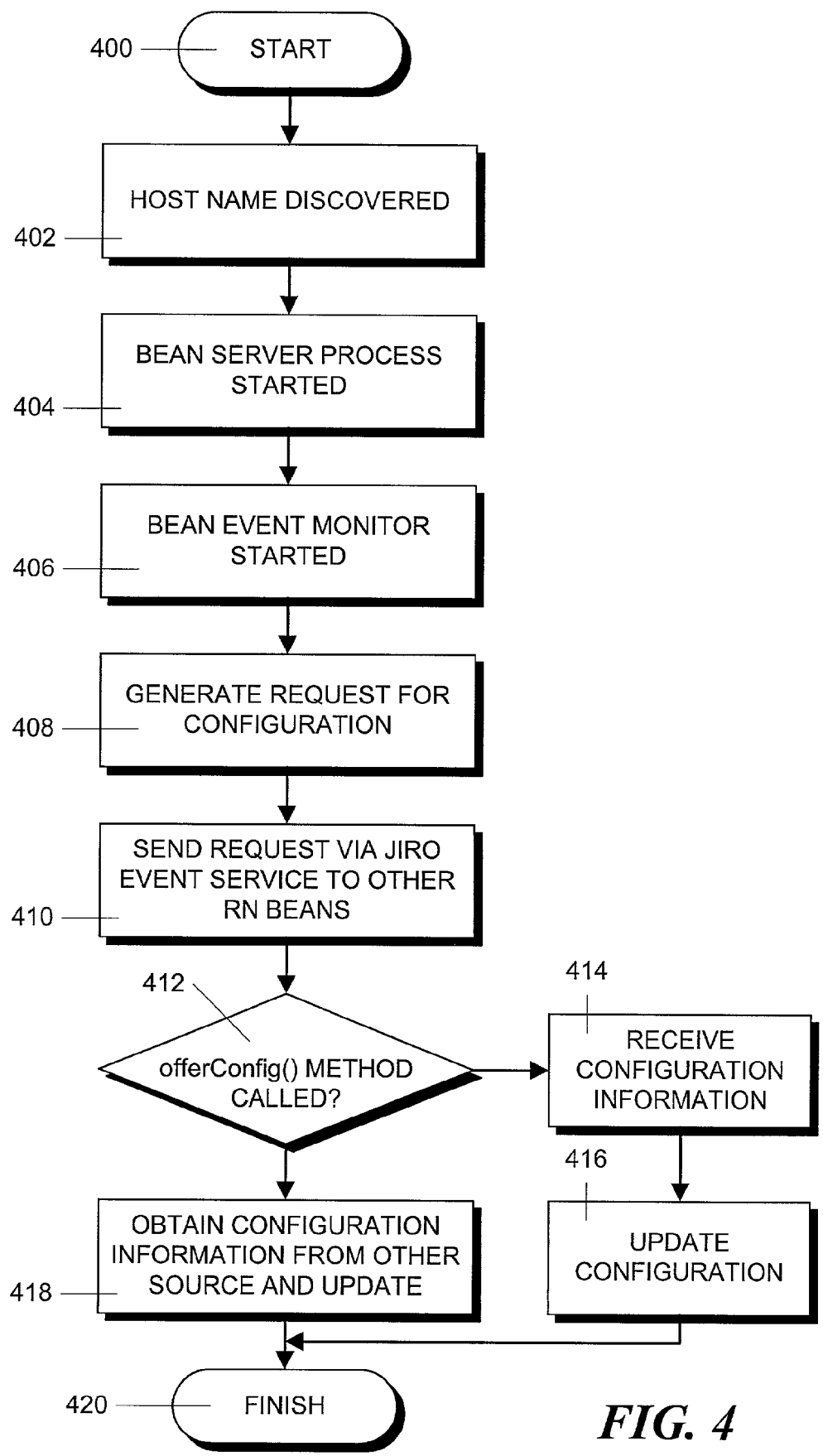
FIG. 4 is a flowchart showing an illustrative process for starting the operation of an RN bean.

The startup sequence for an RN bean, such as bean 200, is illustrated in the flowchart of FIG. 4 and prepares the bean for normal operation. In particular, the process starts in step 400 and proceeds to step 402 where the host name of the host in which the bean is running is discovered. In step 404, the RN bean server process is started and the RN bean event monitor 212 is started in step 406. Next, in step 408, the configuration notifier 214 in the bean generates a "request for configuration" event and posts the event to the Jiro™ event service 220. In step 410, this event is sent out by the Jiro™ event service 220 to any other RN bean that may be running in other hosts. If another RN bean receives the configuration request message, then it can call the offerConfig( ) method in the requesting bean in order to transfer the current RN bean configuration information from the other bean to the requesting bean. If, as determined in step 412, such a call is made, then the RN bean receives configuration information for the other RN bean in step 414, updates its configuration list in step 416 and the process finishes in step 420.

Alternatively, if no other RN bean responds within a predetermined time limit (for example, ten seconds) as determined in step 412, then, in step 418, the requesting bean obtains the last known configuration from another source, such as a configuration manager bean. The process then finishes in step 420. Once these steps are complete, an RN bean is ready and active.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. Apparatus for notifying administrators of selected events generated by an event service in a distributed computer system having a plurality of host computers, comprising:

a federated bean running in each host computer system, the federated bean including:

an event monitor that monitors the event service to detect events generated by the event service, a category list of selected events, wherein the category list contains the same events in all of the federated beans;

a configuration notifier that generates configuration change events and forwards the generated configuration change events to the event service when any changes are made to the category list;

a configuration monitor that receives configuration change events from the event service and updates the category list in response thereto so that category lists in all of the federated beans contain the same events even though a change is made to a category list in only one bean; and a message generator that sends human-readable messages to the administrators when a detected event matches an event in the category list.

2. The apparatus of claim 1 wherein the message generator comprises a mechanism for composing and forwarding e-mail messages to the administrators.

3. The apparatus of claim 1 wherein the distributed computer system has a logging service that maintains a log of events generated by the event service and wherein the federated bean comprises a log monitor that periodically scans the log and controls the message generator to send human-readable messages to the administrators.

4. The apparatus of claim 1 wherein the category list comprises a plurality of categories, each of the categories having a list of users and a list of event topics associated therewith.

5. The apparatus of claim 4 wherein the category list has a list of log message topics associated therewith.

6. The apparatus of claim 1 wherein the federated bean comprises a configuration notifier operable during startup of the bean for requesting configuration information from another federated bean in the distributed computer system.

7. The apparatus of claim 6 wherein the federated bean has an interface including a method for receiving configuration information and the another federated bean calls the method in order to transfer configuration information to the federated bean.

8. A method for notifying administrators of selected events generated by an event service in a distributed computer system having a plurality of host computers, comprising:

(a) running in each host computer system, a federated bean that includes a category list of selected events, wherein the category list contains the same events in all of the federated beans;

(b) using the federated bean to monitor the event service to detect events generated by the event service;

(c) using the federated bean to generate configuration change events and to forward the generated configuration change events to the event service when any changes are made to the category list;

(d) receiving configuration change events from the event service and updating the category list in response thereto so that category lists in all of the federated beans contain the same events even though a change is made to a category list in only one bean; and (e) using the federated bean to generate and send human-readable messages to the administrators when a detected event matches an event in the category list.

9. The method of claim 8 wherein step (e) comprises using the federated bean to compose and forward e-mail messages to the administrators.

10. The method of claim 8 wherein the distributed computer system has a logging service that maintains a log of events generated by the event service and wherein the method further comprises:
   (f) using the federated bean to periodically scan the log.

11. The method of claim 8 wherein the category list comprises a plurality of categories, each of the categories having a list of users and a list of event topics associated therewith.

12. The method of claim 11 wherein the category list has a list of log message topics associated therewith.

13. The method of claim 8 further comprising:
   (f) using the federated bean during startup of the bean to request configuration information from another federated bean in the distributed computer system.

14. The method of claim 13 wherein the federated bean has an interface including a method for receiving configuration information and the method further comprises:
   (g) using the other federated bean to call the method in order to transfer configuration information to the federated bean.

15. A computer program product for notifying administrators of selected events generated by an event service in a distributed computer system having a plurality of host computers, the computer program product comprising a tangible computer usable storage medium having computer readable program code thereon, including:
   federated bean program code that can be run to create in each host computer system a federated bean which maintains a category list of selected events, wherein the category list contains the same events in all of the federated beans;
   federated bean program code that generates configuration change events and forwards the generated configuration change events to the event service when any changes are made to the category list;
   program code that monitors the event service to detect events generated by the event service;
   federated bean code that receives configuration change events from the event service and updates the category list in response thereto;
   federated bean code that receives configuration change events from the event service and updates the category list in response thereto so that category lists in all of the federated beans contain the same events even though a change is made to a category list in only one bean; and
   program code that generates and sends human-readable messages to the administrators when a detected event matches an event in the category list.

16. The computer program product of claim 15 wherein the program code that generates and sends human-readable messages to the administrators comprises program code that composes and forwards e-mail messages to the administrators.

17. The computer program product of claim 15 wherein the distributed computer system has a logging service that maintains a log of events generated by the event service and wherein the computer program product further comprises program code that periodically scans the log and sends human-readable messages to the administrators when selected log messages are present.

18. Apparatus for notifying administrators of selected events generated by an event service in a distributed computer system having a plurality of host computers, comprising:
   federated bean means for maintaining a category list of selected events in each host computer system, wherein the category list contains the same events in all of the federated bean means;
   federated bean means for generating configuration change events and forwarding the generated configuration change events to the event service when any changes are made to the category list;
   means for monitoring the event service to detect events generated by the event service;
   federated bean means for receiving configuration change events from the event service and updating the category list in response thereto so that category lists in all of the federated beans contain the same events even though a change is made to a category list in only one bean; and
   means for sending human-readable messages to the administrators when a detected event matches an event in the category list.

19. The apparatus of claim 18 wherein the message sending means comprises means for composing and forwarding e-mail messages to the administrators.

20. The apparatus of claim 18 wherein the distributed computer system has a logging service that maintains a log of events generated by the event service and wherein the federated bean means comprises means for periodically scanning the log and controlling the message sending means to send human-readable messages to the administrators.

* * * * *